United States Patent [19]

Hignutt

[11] Patent Number: 4,575,670

[45] Date of Patent: Mar. 11, 1986

[54] BATTERY CHARGING SYSTEM

[76] Inventor: Frank A. Hignutt, 602 "E" St., Millville, N.J. 08332

[21] Appl. No.: 584,915

[22] Filed: Feb. 29, 1984

[51] Int. Cl.[4] .............................. H02J 7/04; H02J 9/00
[52] U.S. Cl. ........................................ 320/14; 307/66; 320/17; 320/21; 320/32; 320/37
[58] Field of Search .................. 320/14, 20, 21, 15–18, 320/37, 38, 39, 40, 32; 307/66, 48; 318/139

[56] References Cited

U.S. PATENT DOCUMENTS

| | | | |
|---|---|---|---|
| 3,280,397 | 10/1966 | Bruns | 320/17 X |
| 3,790,810 | 2/1974 | Rogers et al. | 307/66 |
| 4,079,303 | 3/1978 | Cox | 320/17 |
| 4,220,872 | 9/1980 | Fahey | 307/66 X |
| 4,277,692 | 7/1981 | Small | 307/66 |
| 4,323,820 | 4/1982 | Teich | 307/66 X |

Primary Examiner—R. J. Hickey
Attorney, Agent, or Firm—Harvey B. Jacobson

[57] ABSTRACT

A bank of storage batteries is maintained in a fully charged state by a charging circuit coupled by a controlled, battery energized inverter to AC load lines to which the charging circuit and an AC source are connected. Charging current is controlled in accordance with the load current in the load lines through the primary windings of transformers in the charging circuit and applied to the batteries at a voltage level slightly higher than the full standby battery voltage. Application of full battery voltage to the AC load lines is delayed during a timed start-up period.

19 Claims, 6 Drawing Figures

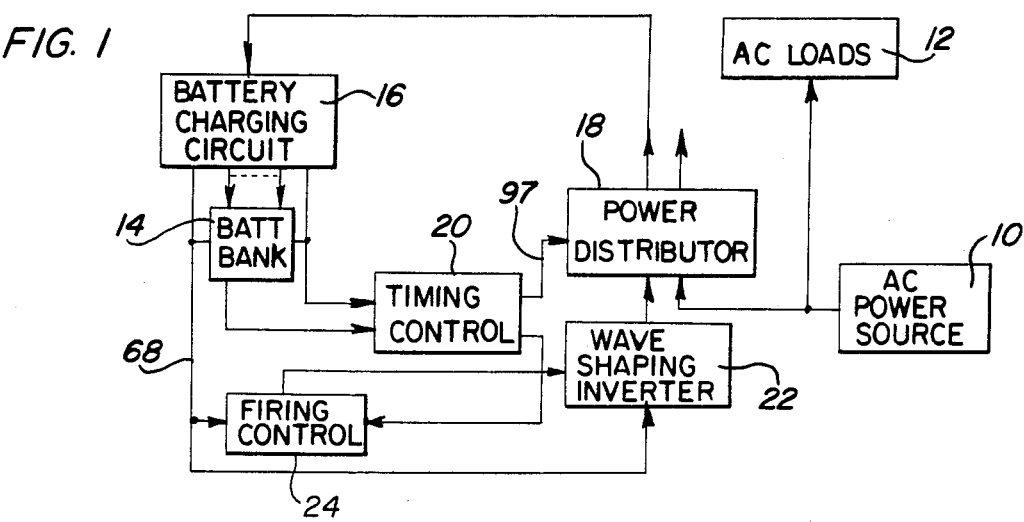
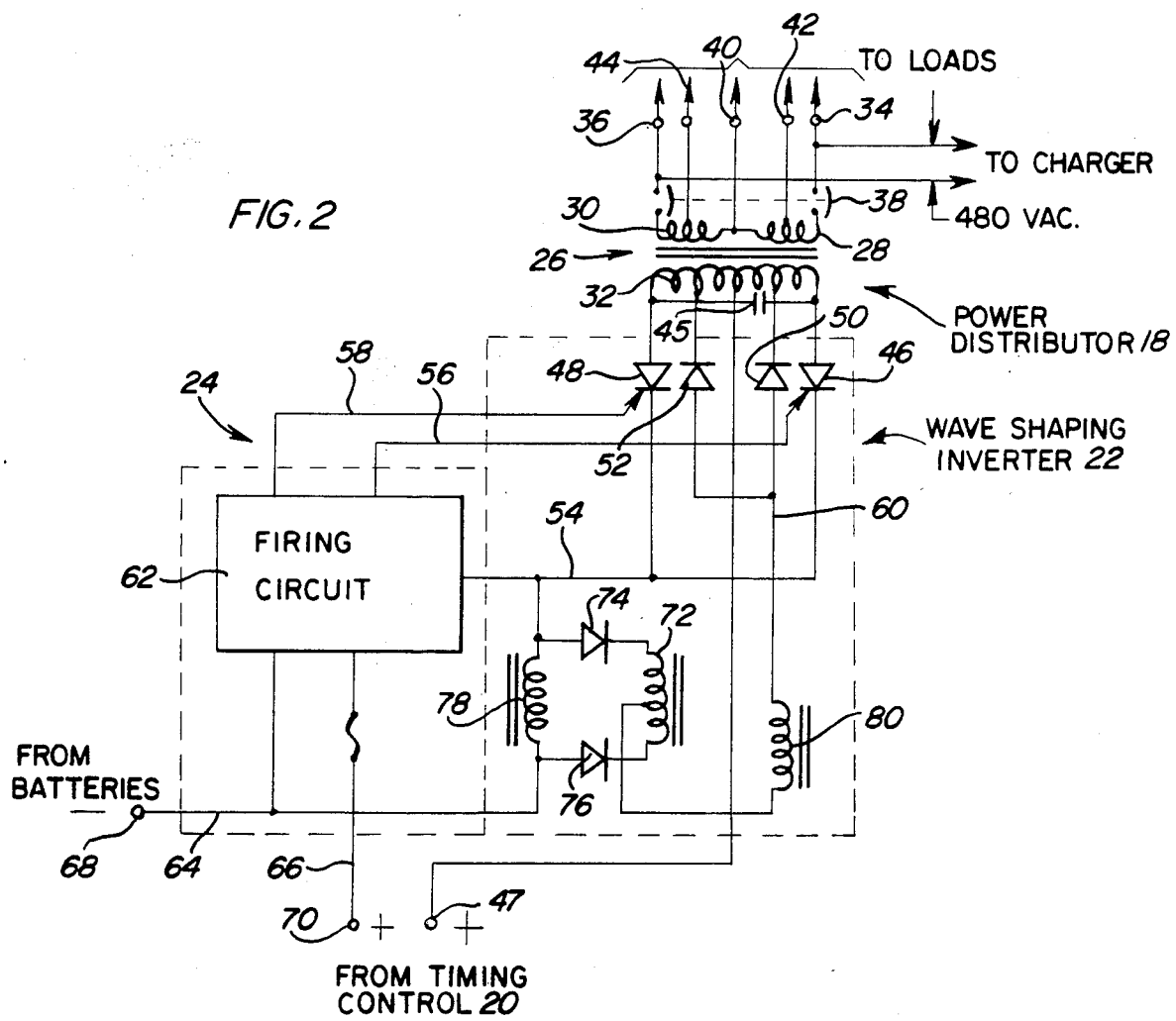

1

BATTERY CHARGING SYSTEM

BACKGROUND OF THE INVENTION

This invention relates generally to the charging of storage batteries utilized as a standby source of electrical energy for operation of AC loads normally supplied from an available source of AC voltage.

Storage batteries interconnected in series to establish a bank of batteries between end terminals of opposite polarity are generally well known for supply of electrical energy at a relatively high voltage, such as 120 VDC. Charging of such bank of batteries is ordinarily effected from an AC source, such as a three wire, 60 cycle output of an electrical generator through voltage converters including full wave rectifiers and power coupling transformers. The charging current to the batteries is usually controlled or regulated through the secondary winding of the transformers to maintain the batteries in a fully charged state. The full standby voltage of the bank of batteries when manually switched on to one or more AC loads, must be converted from DC to AC. The use of voltage inverters controlled by firing circuits for such purposes is already well known.

However, the charging of the aforementioned storage battery banks in accordance with prior art charging systems is not completely satisfactory in many loading installations. For example, abrupt changes in load caused either unexpectedly or deliberately by manual switching will sometimes cause damage, from high transients, to either the AC loads, the charging circuit or both. Also, the batteries may not be reliably maintained in a fully charged state and proper operation of the AC loads may not therefore be assured when supplied by energy from the batteries.

It is therefore an important object of the present invention to provide a charging system for a bank of storage batteries which will be maintained in a fully charged state while current is continuously drawn therefrom under varying load conditions imposed on the system dependent either on the AC loads themselves, the AC source to which the loads are connected, or both.

An additional object in accordance with the foregoing object is to more efficiently maintain full charge on the batteries by control over the distribution of current for battery charging and load operating purposes.

SUMMARY OF THE INVENTION

In accordance with the present invention each battery in the bank is connected across the output terminals of one of a plurality of full wave rectifiers interconnected in series with each other through jumpers to which the intermediate junctions between the batteries are connected by fused lines for conducting bi-directional current. Only the end terminals of the battery bank conduct undirectionally under a full standby voltage applied to loads coupled thereto by a wave shaping inverter and a power distributing transformer. Charging current is fed to the batteries from the secondary winding of the power distributing transformer to which the AC source and the AC loads are connected by load lines. A firing circuit energized by the batteries under less than the full standby voltage controls operation of the inverter so as to convert the battery voltage into proper wave shape, frequency and phase for application to the load lines. The condition of the load current in the load lines regulates the output of a unijunction transistor in the charging circuit acting as a pulse generator to supply pulses to a filament transformer producing gating voltage signals through pilot control devices coupled to signal controlled electrodes of current controlling switch devices through which the charging current is fed from the power distributing transformer to the primary windings of the transformers in the charging circuit applying primary controlled charging voltage to the aforementioned full wave rectifiers of the charging circuit at a level slightly higher than the battery standby voltage.

A timing control delays the application of full standby battery voltage to the loads through the power distributing transformer for a start-up period while the firing circuit and inverter are energized by the battery. The delay period duration is determined by a battery energized timer manually turned on in a residential installation, for example, wherein heating and lighting types of loads are serviced by the standby battery charging system of the present invention. In another type of installation having an AC load in the form of a three phase drive motor adapted to be accelerated from standstill under a lower voltage up to rated speed, application of full battery voltage is also delayed by a timer that is turned on in sequence at the end of the timing cycle of a first timer switched on to initiate the start-up process. The first timer delays application of a lower battery voltage from an intermediate junction terminal of the battery bank. The foregoing installation may be a propulsion system of an automative vehicle wherein the drive motor is coupled to a transmission through a magnetic clutch. The clutch engaging coil and another firing circuit to control clutch engagement would then form additional loads to which energy is fed from the bank of batteries and the AC source which is in the form of an electrical generator associated with the vehicle installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram schematically illustrating the installation of the present invention.

FIG. 2 is an electrical circuit diagram illustrating in detail certain components shown in FIG. 1.

DETAILED DESCRIPTION OF PREFERRED EMBODIMENTS

Figure 3:
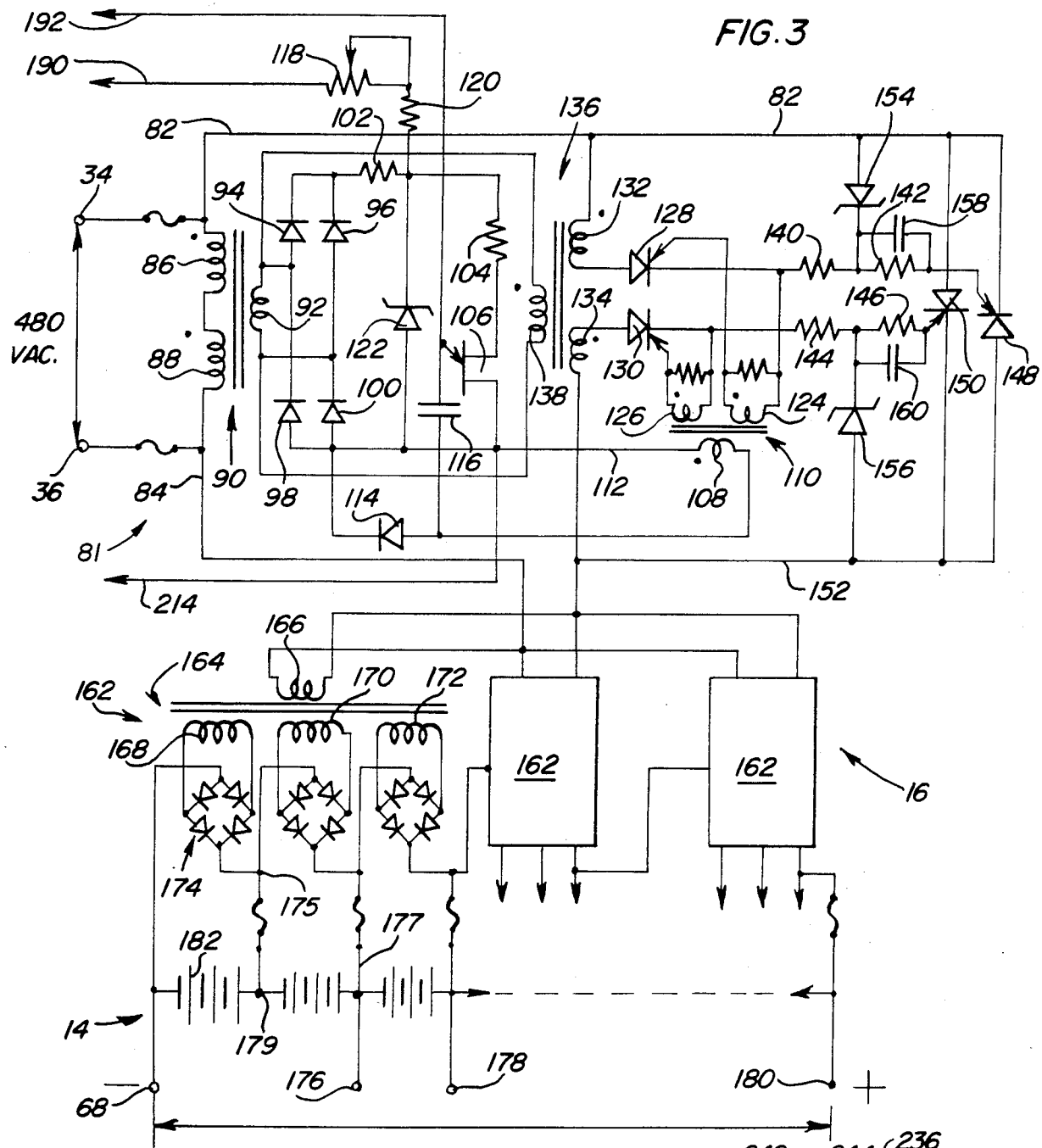
FIG. 3 is an electrical circuit diagram illustrating in detail the battery charging circuit shown in FIG. 1.

Referring now to the drawings in detail, FIG. 1 schematically illustrates the system of the present invention through which electrical energy from an AC power source 10 is supplied to AC electrical loads 12. The power source 10 may, for example, be a three wire, 60 cycle 120/240 volt supply from a power utility or the output of an AC electrical generator. The AC loads 12 may include electrical heating equipment, three phase AC motors and electrical lighting equipment. In accordance with the present invention, the loads 12 at times draw current from a bank of energy storing batteries 14 that are maintained in a fully charged state by the AC power source 10.

The bank of batteries 14 are charged through a battery charging circuit 16 to which energy is supplied from source 10 through a power distributor component 18. The power distributor 18 receives energy from the source 10 and from the bank of batteries 14, through a wave shaping inverter 22 under control of a timing component 20. The inverter 22 is switched on and off for wave shaping purposes by a firing control 24 to which the timing control 20 is connected.

In operation, current is supplied to the inverter 22 the instant it is switched on by the firing control 24, from the batteries of bank 14. Thereafter, the batteries float on line while charging current from circuit 16 is fed to the inverter and maintains the batteries in a fully charged state. The charging current is supplied at a voltage slightly higher than the standby battery voltage so that when the batteries are fully charged the internal resistance thereof blocks charging current to the batteries. Substantially all charging current is then fed to the inverter 22 from which load current is delivered through the power distributor 18 to resistive or inductive loads 12 without any reduction in the specific gravity of the battery electrolyte. The battery charging rate is controlled in circuit 16 by the load current being drawn from the inverter 22 through the power distributor.

FIG. 2 illustrates in greater detail the power distributor 18, the inverter 22 and the firing control 24. The power distributor includes a load distributing transformer 26 having a pair of output secondary windings 28 and 30 and a primary winding 32. The secondary windings are interconnected in series between end terminals 34 and 36 having a ganged circuit breaker assembly 38. The end terminals 34 and 36 are connected to the loads and to the battery charging circuit for supply of 480 VAC energy thereto. Also connected to the loads is a center terminal 40 from the junction between the secondary windings 28 and 30, and additional load terminals 42 and 44 from center taps on the windings 28 and 30. A commutating capacitor 45 is connected across the end terminals of primary winding 32, while a center tap on winding 32 is connected by terminal 47 of the timing control 20 to the batteries of bank 14 as will be explained hereinafter.

The end terminals of the primary winding of load distributing transformer 26 are respectively connected to the anodes of a pair of gate controlled silicon controlled rectifiers (SCRs) 46 and 48 in the inverter 20 which also has a pair of diodes 50 and 52. The cathodes of diodes 50 and 52 are respectively connected to spaced taps on the primary winding 32. The cathodes of SCRs 46 and 48 are connected in parallel to a voltage supply line 54 from the firing control 20. Signal voltages from the firing control 20 are applied through signal lines 56 and 58 to the gate electrodes of the SCRs 46 and 48 causing them to switch on. The anodes of the diodes 50 and 52 are connected in parallel to a feedback conductor 60.

The firing control 24 includes a conventional firing circuit 62 within which the switching signals in lines 56 and 58 are generated to cyclically control the current conducted from line 54 to one of the end terminals of primary winding 32 through one of the SCRs 46 and 48. The firing circuit is powered by a relatively low battery voltage applied across line 64 and fused line 66. Battery voltage line 64 is connected to one end terminal 68 of the battery bank 14 while line 66 is connected by terminal 70 of the timing control 20 to another battery terminal as will be explained in detail hereinafter. The firing circuit 62 operates the inverter 22 in a class B sine wave manner when inductively loaded by transformer 26 with passive stabilization provided for by a differential choke 72 having opposite terminals connected by diodes 74 and 76 to the terminals of a choke 78 connected across lines 54 and 64. A center tap on choke 72 is coupled by a feedback current limiting choke 80 to the feedback line 60. Feedback current from transformer primary winding 32 rectified by diodes 50 and 52 is accordingly distributed equally at the opposite terminals of choke 78 to eliminate output voltage distortion that would otherwise occur as a result of pulsating voltage on line 64 which serves as a feedback current path in addition to line 54 in accordance with the present invention. Also, output voltage clipping that would otherwise occur without the inductive coupling action of choke 78, is eliminated by use of the differential choke 73 isolated from choke 78 by the diodes 74 and 76. Thus, the chokes 72, 78 and 80 and diodes 50, 52, 74 and 76 provide rapid feedback paths for excess reactive current and eliminate unwieldly voltage transients, caused by abrupt changes in output loading, without substantial clipping or distortion of the output voltage wave shape produced by the inverter.

FIG. 3 illustrates in detail the battery charging circuit 16 to which 480 VAC power is inductively applied from the load terminals 34 and 36 aforementioned to a switching control section 81 of the circuit. The AC voltage at terminals 34 and 36 is applied across fused input lines 82 and 84 connected to the opposite terminals of series connected primary windings 86 and 88 of a transformer 90 in the section 81. The transformer 90 also has a secondary winding 92 connected by a full wave rectifier bridge, formed by diodes 94, 96, 98 and 100, and by resistors 102 and 104 across the input and output electrodes of a pulse synchronizing unijunction transistor 106. The unijunction transistor 106 is triggered on both halves of each AC power cycle to deliver pulses during each half-cycle to one terminal of a primary winding 108 of pulse transformer 110 through line 112. The other terminal of winding 108 is isolated from line 112 by diode 114 and is coupled by capacitor 116 to the control electrode of the unijunction transistor 106. Capacitor 116 together with resistors 118 and 120 determine the delay angle at which the unijunction transistor 106 delivers the pulses to winding 108. A Zener diode 122 is connected to the junction between resistors 102, 120 and 104 and to line 112 to limit the amplitude of the pulses.

The pulses delivered to the winding 108 of transformer 110 are inductively coupled through the transformer secondary windings 124 and 126 to the gate electrodes of pilot signal producing SCRs 128 and 130 respectively connected to the secondary windings 132 and 134 of a filament transformer 136. The primary winding 138 of transformer 136 is connected in parallel with the secondary winding 92 of transformer 90 so as to conduct a low voltage AC current in phase with the pulse generating voltage induced in winding 92. The pilot SCRs 128 and 130 have their cathodes respectively coupled by resistors 140, 142 and 144, 146 to the gates of a pair of oppositely poled SCR switches 148 and 150 connected across the input voltage line 82 and an output voltage line 152 to which windings 132 and 134 are respectively connected for control of charging current delivered to the bank of batteries. Zener diode 154 is connected between the junction of resistors 140 and 142 and line 82, while Zener diode 156 is connected between the junction of resistors 144 and 146 and line 152 to clip the AC gate voltages applied to the gates of SCRs 148 and 150 and thereby prevent excessive power dissipation. Capacitors 158 and 160 are respectively connected in parallel with resistors 142 and 146 to limit gate voltage dissipation and to accelerate the switching action of the SCRs 148 and 150 causing delivery of momentarily higher gate pules at the beginning of each conduction period. The gate pulses delivered by the pilot SCRs 128 and 130 are square wave shaped and synchronized by the pulse output of transformer 110 with the AC voltage across lines 82 and 152 controlled by the signal-controlled SCR switches 148 and 150.

The controlled output in lines 84 and 152 is applied in parallel to three voltage converters 162, one of which is shown in detail in FIG. 3. Each voltage converter includes a transformer 164 having a primary winding 166 to which the controlled output in lines 84 and 152 is applied. Each transformer 164 has three secondary windings 168, 170 and 172 respectively connected across the inputs of three full wave bridge rectifiers 174. All of the rectifiers 174 are interconnected in series by heavy jumpers at 175 to conduct bidirectional current to and from intermediate battery junctions 179. One output terminal of the rectifier at one end of the bank 14 is directly connected to the negative end terminal 68. All other series connected output terminals of the rectifiers are connected to the intermediate junctions 179 by fused lines 177 including those connected to intermediate terminals 176 and 178. A fused line is also connected to the positive terminal 180 of the battery bank. With a 480 VAC voltage across controlled voltage lines 84 and 152, the rectifiers 174 receive 16 VAC charging voltages to apply DC rectified charging current to nine storage batteries 182 connected in series with each other between adjacent battery junctions 179. A 120 full DC battery voltage will appear across the end terminals 68 and 180 while less than full battery voltages will appear across the battery terminals 68 and 176 or 68 and 178.

Figure 4:
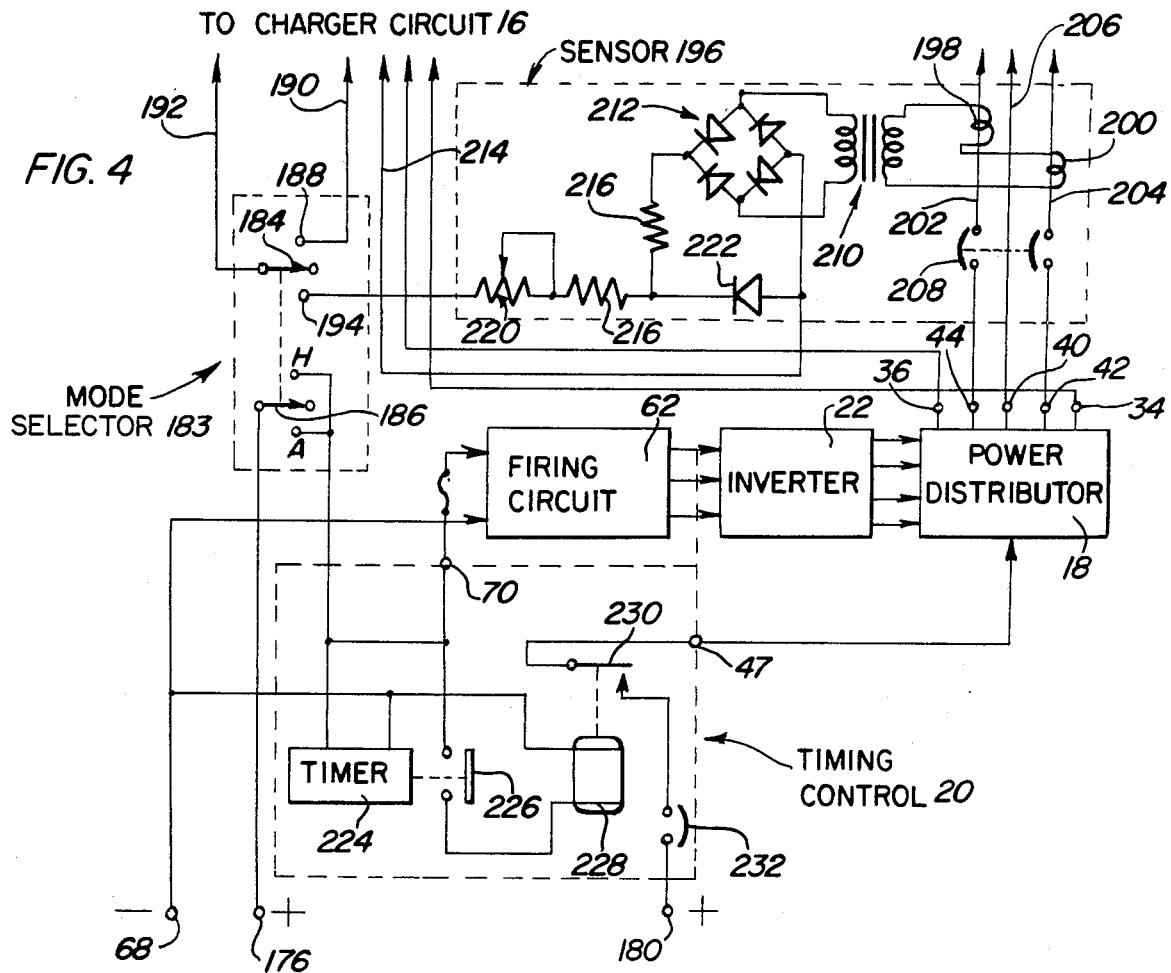
FIG. 4 is an electrical circuit diagram illustrating the timing control and other components associated with one particular installation in accordance with one embodiment of the invention.

As a start-up precaution, the loading on the inverter 22 should be removed by tripping all load connecting circuit breakers, including the circuit breaker 38, while the firing circuit 62 is being initially energized by the batteries through terminals 68 and 70 aforementioned in connection with FIG. 2. The start-up procedure may then continue under control of the timing control 20 in accordance with one embodiment of the invention as depicted in FIG. 4. A mode selector 183 is shown having a pair of ganged switches 184 and 186 displaceable from an off position to either a manual or an automatic position. In the manual position, switch 184 engages contact 188 to directly connect adjustable resistor 118 through line 190 to the control electrode of unijunction transistor 106 of the charging circuit 16 through line 192 as shown in FIG. 3. The output pulse rate of the transistor 106 will then be adjustable through resistor 118. In the automatic position of mode selector 183, the switch 184 engages contact 194 so that the control electrode of transistor 106 is connected by line 192 and contact 194 to a sensor circuit 196 by means of which the pulse rate is synchronized with the load current being drawn. The sensor circuit includes a pair of current sensing coils 198 and 200 operatively positioned relative to the power load lines 202 and 204 of a three wire power supply from the AC source 10 for a residential installation to which the loads are connected, the power supply including a neutral line 206. The lines 202, 204 and 206 are respectively connected to the load terminals 44, 42 and 40 of the power distributor 18, as shown in FIG. 4, through a circuit breaker 208. The sensing coils 198 and 200 are connected in series across the primary winding of a signal transformer 210 having a secondary winding connected to the input of a full wave rectifier 212, one output terminal of which is connected by line 214 to the output pulse generator line 112 in the charging circuit. The other output terminal of rectifier 212 is coupled by series connected resistors 216, 218 and 220 to the automatic contact 194 of switch 184. A Zener diode 222 connected across the output terminals of rectifier 212 in series with resistor 216 limits the amplitude of the rectified signal voltage supplied to contact 194 through the voltage reducing resistors 218 and 220.

In either the manual or automatic position of mode selector 183, switch 186 connects a timer 224 in the timing control 20 across the battery terminals 68 and 176 to initiate a timing cycle at the same time that the terminals 68 and 176 are connected by switch 186 to the firing circuit 62 for energization thereof. At the end of the timing cycle, of 3 to 4 seconds duration, timer switch 226 is closed to energize a relay coil 228 and close its normally open relay switch 230. Relay switch 230 will then connect the positive end terminal 180 of the battery bank through terminal 47 to the center tap on the primary winding 32 of transformer 26 in the power distributor 18. Thus, full power is not applied until the timing delay cycle is terminated. Such delayed start-up occurs only after closing of start-up circuit breaker 232 interconnecting battery terminal 180 to the relay switch 230.

Figure 6:
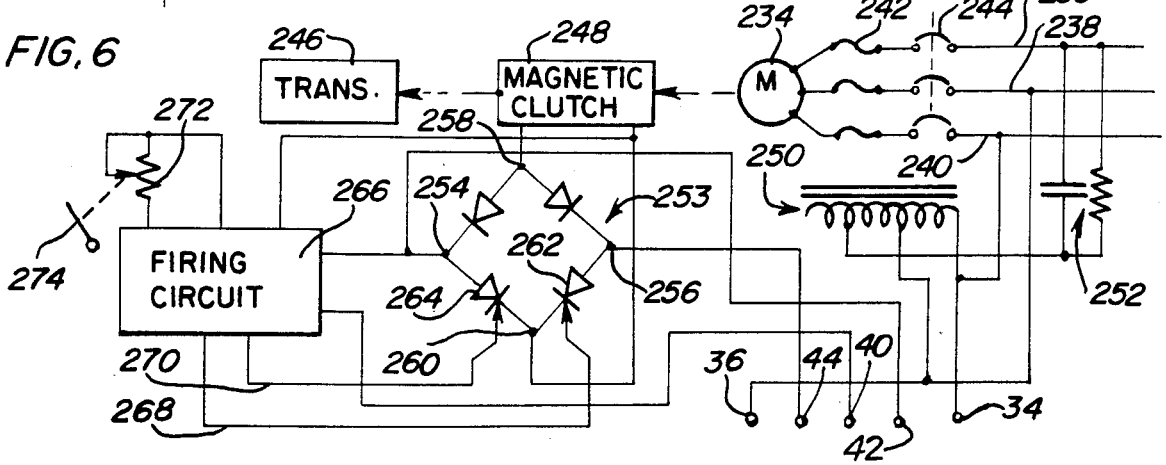
FIG. 6 is an electrical circuit diagram illustrating a vehicle load installation with which the timing control of FIG. 5 may be associated.

The start-up procedure hereinbefore described may be varied to accommodate different types of loads. FIG. 6 illustrates, for example, the loading of an AC generator type of power source in an automotive vehicle installation having a three phase, 40 HP drive motor 234 as its source of propulsion. The motor 234 is accordingly connected to the power phase lines 236, 238 and 240 from the AC source through overload fuses 242 and circuit breakers 244 to drive a transmission 246 through a magnetic clutch 248. The motor 234 has the capability of accelerating from standstill to its full rated speed on a relatively low voltage during a start-up period when the motor is unloaded. Load terminals 34 and 36 are connected across two phase lines 238 and 240 and to spaced taps on an auto-transformer 250 to which a single phase 480 VAC voltage is applied. The third phase line 236 is coupled by a RC network 252 to another tap on the auto-transformer. The spacing of the transformer taps are set to balance the three phase voltages for operation of the motor 234.

In addition to drive of the transmission 246, the motor 234 may drive other loads such as vacuum and refrigerant pumps of the vehicle installation. The clutch 248 is timely energized to variably load the motor under control of battery power applied thereto from load terminals 42 and 44 of the power distributor through a full wave rectifier 253 having input terminals 254 and 256 respectively connected to the load terminals 42 and 44. The DC output of rectifier 253 at its output terminals 258 and 260 are applied to the magnetic clutch under control of gate voltages applied to the gates of a pair of SCRs 262 and 264 in the bridge circuit of rectifier 253. The gate voltages are generated in a second conventional firing circuit 266 connected by signal lines 268 and 270 to the gates of SCRs 262 and 264. Operating voltage for the firing circuit 266 is applied from load terminals 40 and 42 and its operation is controlled through a rheostat 272 actuated by an accelerator pedal 274 of the vehicle. The accelerator pedal 274 will accordingly control the power to the transmission 246 through magnetic clutch 248 in a manner analogous to the control exercized by a conventional accelerator pedal for a fuel powered engine.

Figure 5:
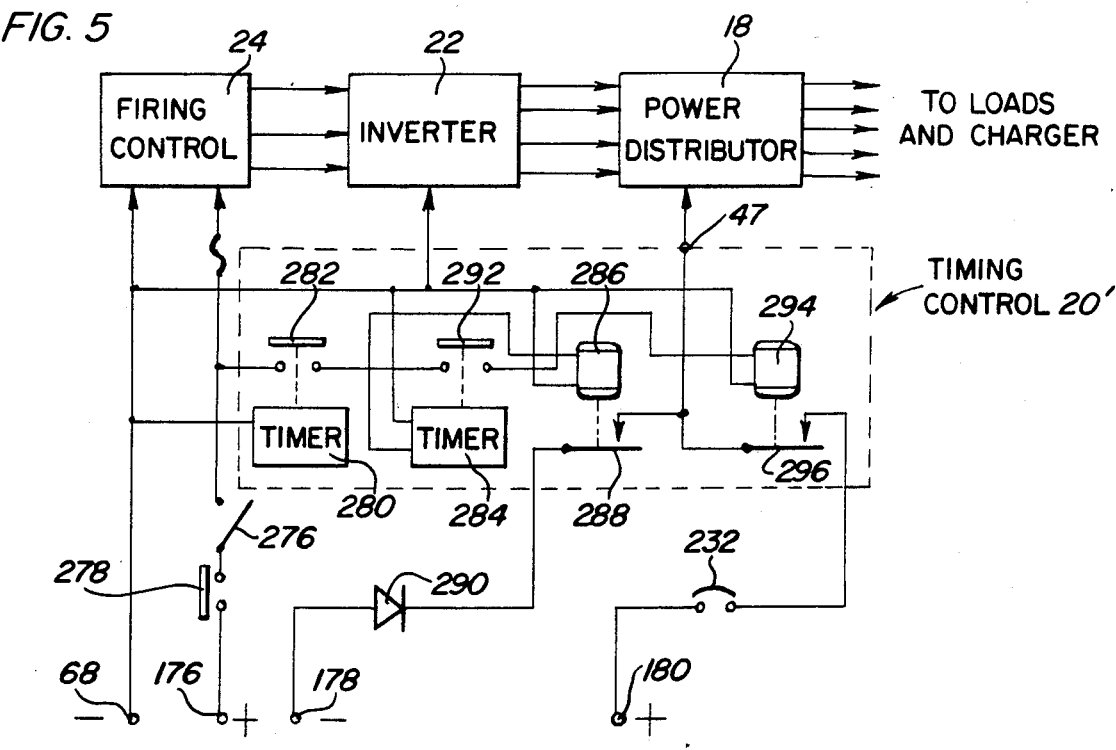
FIG. 5 is an electrical circuit diagram showing a modified form of timing control for use in another type of load installation.

Start-up for the embodiment shown in FIG. 6 is initiated by closing of a key operated motor starting switch 276 connected by overload switches 278 to the battery terminal 176 as shown in FIG. 5 which illustrates another form of timing control 20'. Since the starting load is always small for the vehicle installation described in connection with FIG. 6, all circuit breakers are first closed, including circuit breaker 232. Closing of key switch 276 will energize the firing circuit 62 of the firing control 24 and initiate switch on of the inverter 22 as hereinbefore described with respect to FIG. 2. At the same time, timer 280 is energized to initiate a delay timing cycle of approximately 3 seconds duration. At the end of this timing cycle, timer switch 282 is closed to energize a second timer 284 and a relay coil 286. The relay coil 286 then closes relay switch 288 to connect battery terminal 178 through diode 290 and output terminal 47 of the timing control to the center tap on the primary winding 32 in the power distributor 18. A less than full voltage is accordingly supplied by battery terminals 68 and 178 to the drive motor 234 from the load terminals of the power distributor 18 to slowly bring the motor up to full speed within the timing cycle of timer 284 of about 10 seconds duration. At the end of this second timing cycle, timer switch 292 is closed to energize relay coil 294. When energized, relay coil 294 closes relay switch 296 to connect the battery terminal 180 to output terminal 47 and thereby apply full voltage to the power distributor from the bank of batteries for full power operation of the drive motor. Vehicle propulsion may then be initiated by putting the transmission 246 into gear and actuating the accelerator 274 to control engagement of clutch 248 through firing circuit 266.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an AC voltage source, a charging circuit for a plurality of storage batteries interconnected in series at intermediate junctions between end terminals of opposite polarity, said charging circuit having a plurality of voltage converters respectively connected to said batteries and switching control means operatively connected to the voltage converters for controlling the charging of the batteries through the voltage converters, the improvement comprising jumper means connected to the intermediate junctions for interconnecting the voltage converters in series with each other and in parallel to the respective batteries, said voltage converters including current rectifiers and transformer means having a plurality of secondary windings respectively coupled exclusively to said current rectifiers and primary windings connected to the switching control means, at least one AC load, a power distributor operatively connecting the source to the load and the charging circuit, a voltage inverter operatively connecting the power distributor to the batteries, and firing control means connected to the batteries and the inverter for establishing a predetermined wave shape with respect to voltage applied from the batteries to the power distributor.

2. The combination of claim 1 including timing control means for delaying supply of energy from the batteries to the power distributor during a start-up period.

3. The combination of claim 2 wherein the timing control means includes time delay relay means for applying full voltage across the end terminals of the batteries to the power distributor upon termination of said start-up period, and timer means connected to one of the intermediate junction between the batteries for initially delaying supply of energy to the power distributor at less than the full voltage.

4. The combination of claim 2 including current sensing means connected to the switching control means for controlling the rate of said charging of the batteries by the charging circuit as a function of the load current drawn from the power distributor by said AC load.

5. The combination of claim 4 wherein said switching control means includes a signal controlled switch device interconnecting the power distributer and the primary windings of the transformer means, pulse generating means operatively coupled to the power distributor for producing control signals, and means responsive to said control signals for controlling operation of the signal controlled switch device.

6. The combination of claim 5 including means connecting the sensing means to the pulse generating means for varying the pulse rate of the control signals in accordance with variations of the load current.

7. The combination of claim 1 wherein said switching control means includes a signal controlled switch device interconnecting the power distributer and the primary windings of the transformer means, pulse generating means operatively coupled to the power distributor for producing control signals, and means responsive to said control signals for controlling operation of the signal controlled switch device.

8. The combination of claim 7 including current sensing means connected to the pulse generating means for controlling the rate of said charging of the batteries by the charging circuit as a function of the load current drawn from the power distributor by said AC load.

9. The combination of claim 3 wherein said AC load is a drive motor accelerated toward a rated output speed by said supply of energy to the power distributer at less than the full voltage and operation at the rated speed under the full voltage.

10. The combination of claim 9 including additional load means connected to the power distributor for initially unloading the power distributor from the AC load.

11. The combination of claim 10 wherein said additional load means includes magnetic clutch means connected to the drive motor for transmission of mechanical energy therefrom, and selectively adjustable voltage converting means connected to the clutch means for varying said transmission of the mechanical energy.

12. The combination of claim 1 including additional load means connected to the power distributor for initially unloading the power distributor from the AC load.

13. The combination of claim 12 wherein said AC load is a drive motor and said additional load means includes magnetic clutch means connected to the drive motor for transmission of mechanical energy therefrom, and selectively adjustable voltage converting means connected to the clutch means for varying said transmission of the mechanical energy.

14. The combination of claim 1 wherein said control means comprises a signal controlled switch device interconnecting the source and the primary windings, pulse generating means connected to the source for producing control signals, and means responsive to said control signals for controlling operation of the signal controlled switch device.

15. In combination with an AC voltage source, a charging circuit for a plurality of storage batteries interconnected in series at intermediate junctions between end terminals of opposite polarity, said charging circuit having a plurality of voltage converters respectively connected to said batteries, said voltage converters including current rectifiers and transformer means having a plurality of secondary windings respectively coupled exclusively to said current rectifiers and primary windings operatively connected to the source, control means operatively connected to the primary windings for controlling the charging of the batteries through the voltage converters from the source, said control means comprising a signal controlled switch device interconnecting the source and the primary windings, pulse generating means connected to the source for producing control signals, and means responsive to said control signals for controlling operation of the signal controlled switch device, at least one AC load connected to the source and current sensing means responsive to load current drawn by the AC load for varying the pulse rate of the control signals produced by the pulse generating means.

16. The combination of claim 15 including voltage converting means operatively connecting the batteries to the AC load for supply of energy thereto in parallel with the source.

17. The combination of claim 16 including means energized by the batteries for delaying supply of energy from the batteries under full voltage to the AC load.

18. The combination of claim 17 wherein said battery energized means includes timer means connected to one of the end terminals and one of the intermediate junctions of the batteries for establishing a start-up timing cycle of predetermined duration, and relay means responsive to termination of said timing cycle for coupling the other of the end terminals of the batteries to the AC load.

19. In combination with an AC voltage source, a charging circuit for a plurality of storage batteries interconnected in series at intermediate junctions between end terminals of opposite polarity, said charging circuit having a plurality of voltage converters respectively connected to said batteries, said voltage converters including current rectifiers and transformer means having a plurality of secondary windings respectively coupled exclusively to said current rectifiers and primary windings operatively connected to the source, control means operatively connected to the primary windings for controlling the charging of the batteries through the voltage converters from the source, timer means connected to one of the end terminals and one of the intermediate junctions of the batteries for establishing a start-up timing cycle of predetermined duration, and relay means responsive to termination of said timing cycle for coupling the other of the end terminals of the batteries to the AC load.

* * * * *